US012650218B2

(12) United States Patent
Yang

(10) Patent No.: US 12,650,218 B2
(45) Date of Patent: Jun. 9, 2026

(54) WIRELESS POWERED WATERPROOF TRACK LIGHT

(71) Applicant: SMART ELECTRIC WORKS CO., LTD., Chang Hua Hsien (TW)

(72) Inventor: Jerry Yang, Taichung (TW)

(73) Assignee: SMART ELECTRIC WORKS CO., LTD., Chang Hua Hsien (TW)

( * ) Notice: Subject to any disclaimer, the term of this patent is extended or adjusted under 35 U.S.C. 154(b) by 397 days.

(21) Appl. No.: 18/388,451

(22) Filed: Nov. 9, 2023

(65) Prior Publication Data

US 2025/0155111 A1 May 15, 2025

(51) Int. Cl.

| | |
|---|---|
| *F21V 23/02* | (2006.01) |
| *F21V 21/005* | (2006.01) |
| *F21V 21/096* | (2006.01) |
| *F21V 23/04* | (2006.01) |
| *F21V 31/00* | (2006.01) |
| *H01R 25/14* | (2006.01) |
| *H02J 50/00* | (2016.01) |
| *H02J 50/12* | (2016.01) |

(52) U.S. Cl.
CPC ............ *F21V 23/02* (2013.01); *F21V 21/005* (2013.01); *F21V 21/096* (2013.01); *F21V 23/04* (2013.01); *F21V 31/005* (2013.01); *H01R 25/14* (2013.01); *H02J 50/005* (2020.01); *H02J 50/12* (2016.02)

(58) Field of Classification Search
CPC ...... F21V 23/02; F21V 21/005; F21V 21/096; F21V 23/04; F21V 31/005; H02J 50/12; H02J 50/005; H01R 25/14; H01R 13/6205
See application file for complete search history.

(56) References Cited

U.S. PATENT DOCUMENTS

| | | | | |
|---|---|---|---|---|
| 7,813,131 | B2 * | 10/2010 | Liang | F21V 23/02 |
| | | | | 174/547 |
| 8,894,419 | B1 * | 11/2014 | Buelow | H01R 13/6205 |
| | | | | 439/39 |
| 9,243,789 | B1 * | 1/2016 | Chow | A01G 9/249 |
| 9,360,196 | B2 * | 6/2016 | Nicieja | H01R 25/147 |
| 9,689,539 | B2 * | 6/2017 | Lin | F21V 17/02 |
| 9,874,333 | B2 * | 1/2018 | Lay | F21V 5/04 |
| 9,912,100 | B2 * | 3/2018 | Zantout | F21V 23/06 |
| 9,967,646 | B2 * | 5/2018 | Hankey | H04R 1/1016 |
| 10,186,801 | B2 * | 1/2019 | Zantout | H01R 13/6205 |
| 10,247,401 | B2 * | 4/2019 | Noh | F21V 23/06 |

(Continued)

*Primary Examiner* — Thanh Tam T Le
(74) *Attorney, Agent, or Firm* — Che-Yang Chen; Law Office of Michael Chen

(57) ABSTRACT

The invention discloses a wireless powered waterproof track light, which includes a closed power supply track internally equipped with one or more wireless power supply transmitting modules that comply with wireless charging standards, and first magnets that can absorb lamps. In addition, the lamp outside the power supply track is provided with a wireless power receiving module, and second magnets corresponding to the first magnets. Through the design of wireless power supply, the open structure of the traditional lamp's conductive terminals that needs to be extended into the track to contact the power source can be avoided, and the power supply track can be implemented as a closed structure to achieve the purpose of wireless transmission and power supply, complete waterproofing and convenient installation and adjustment of the lamp.

13 Claims, 8 Drawing Sheets

(56)                    References Cited

U.S. PATENT DOCUMENTS

| | | | |
|---|---|---|---|
| 10,888,125 B2 * | 1/2021 | Anderson | A24F 40/90 |
| 11,060,705 B1 * | 7/2021 | Danesh | F21V 17/10 |
| 11,316,311 B1 * | 4/2022 | Chan | F21S 2/00 |
| 11,760,198 B2 * | 9/2023 | Aberle | H01H 9/0005 |
| | | | 439/39 |
| 11,892,875 B2 * | 2/2024 | Barnett | G06F 1/1684 |
| 11,967,450 B2 * | 4/2024 | Liang | H01F 27/2871 |

* cited by examiner

WIRELESS POWERED WATERPROOF TRACK LIGHT

BACKGROUND OF THE INVENTION

(a) Field of the Invention

The present invention relates to the technical field of track lights, and in particular, to a wireless powered waterproof track light.

(b) Description of the Prior Art

The current track light structure is shown in the publication number WO2018157567A1 and Taiwan Patent Announcement M619216. It is usually implemented with a track for fixing to the wall or ceiling. The bottom surface of the track is formed with an opening connected to its interior, and two conductive strips are provided in the track. The two conductive sheets are connected to the transformer through electrical wires. In addition, a lamp is provided with a sliding seat, and the sliding seat is provided with conductive terminals for contacting the two conductive strips. In this way, the sliding seat of the lamp is installed under the opening of the track, so that the two conductive terminals of the sliding seat are in contact with the two conductive strips for power supply. Therefore, the lamp can be installed at any position on the track, and power can be supplied to the lamp at any position on the track.

However, the tracks of conventional track lights have a structure with openings on the bottom, which makes it easy for water and moisture to invade. Therefore, conventional track lights can only be installed indoors and cannot be used outdoors or even in water. If the track of the track light is to be implemented as a closed structure to prevent the intrusion of water and moisture, there will be a problem that the conductive terminals of the external lamps cannot contact the two conductive strips in the track. In addition, conventional track lights require the use of complex mechanical assembly structures, such as latches, sliders, fixing screws and other components, in order to install the lights on the track. Therefore, its manufacturing cost is high, and the actual installation and adjustment are very inconvenient. For example, multiple fixing screws need to be loosened to move the lamp on the track.

SUMMARY OF THE INVENTION

The main object of the present invention is to provide a wireless powered waterproof track light, which achieves the function of wireless power supply through one or more wireless power supply transmitting modules provided in the power supply track and a wireless power supply receiving module provided in the lamp. And through magnet adsorption technology, the lamps can be adsorbed on the power supply track at will.

A secondary object of the present invention is to provide a wireless powered waterproof track light. Through the above-mentioned wireless power supply and magnet adsorption design, the power supply track can be implemented into a closed track, so that the wireless power supply transmitting module will not be exposed to rainwater in the power supply track, and the wireless powered waterproof track light can be used as an outdoor waterproof track light.

In order to achieve the above objects, the preferred technical solution of the wireless powered waterproof track light of the present invention consists of a power supply track, a wireless power supply transmitting module and a lamp. The power supply track comprises a track body and two conductive strips. The outer surface of the track body has a lamp mounting surface, and the interior of the track body has a closed sliding space corresponding to the lamp mounting surface. The two conductive strips are arranged in the closed sliding space and extend parallel to the lamp mounting surface to supply power to the wireless power supply transmitting module.

The wireless power supply transmitting module comprises a slide, a transmitting coil, two conductive terminals and two first magnets. The slide is set in the closed sliding space of the d track body to move arbitrarily within the closed sliding space. The transmitting coil is arranged on the slide to generate a magnetic field in the closed sliding space toward the lamp mounting surface. The two conductive terminals are fixed on the slide and connected to the transmitting coil. The two conductive terminals removably contact the two conductive strips. The first magnets are fixed on the slide to adsorb each other with the lamp.

The lamp comprises a lamp body, a receiving coil and two second magnets. The lamp body is detachably set on the lamp mounting surface of the track body and movable on the lamp mounting surface. The receiving coil is set in the lamp body to sense the magnetic field of the transmitting coil to generate an induced current and supply power to the lamp body. The second magnets is fixed on the lamp body and is used to attract the first magnets magnetically, so that the lamp body is detachably adsorbed on the lamp mounting surface.

The invention can achieve the following effects:

1. The power supply track wirelessly supplies power to the lamp. The present invention can supply power to the lamp of the track light in a wireless power supply mode through the transmitting coil on the primary side of the wireless power supply transmitting module and the receiving coil on the secondary side of the lamp body.

2. The present invention can be applied into waterproof track lights. The present invention uses wireless power supply technology to eliminate the need for the lamps of conventional track lights to use conductive terminals to contact two conductive strips, and allows the track body to be implemented as a tube body with both ends closed, and the lamp to be implemented as a fully sealed structure, so that the track light can be waterproof and installed outdoors.

3. The present invention allows adsorption and position adjustment at will. The technology of magnetic attraction between the power supply track and the lamp of the present invention eliminates the conventional complicated mechanical fixing structure, so that the lamp can be attracted to any position of the power supply track, making it more convenient for the user to install and adjust the position.

DETAILED DESCRIPTION OF THE PREFERRED EMBODIMENT

Figure 1:
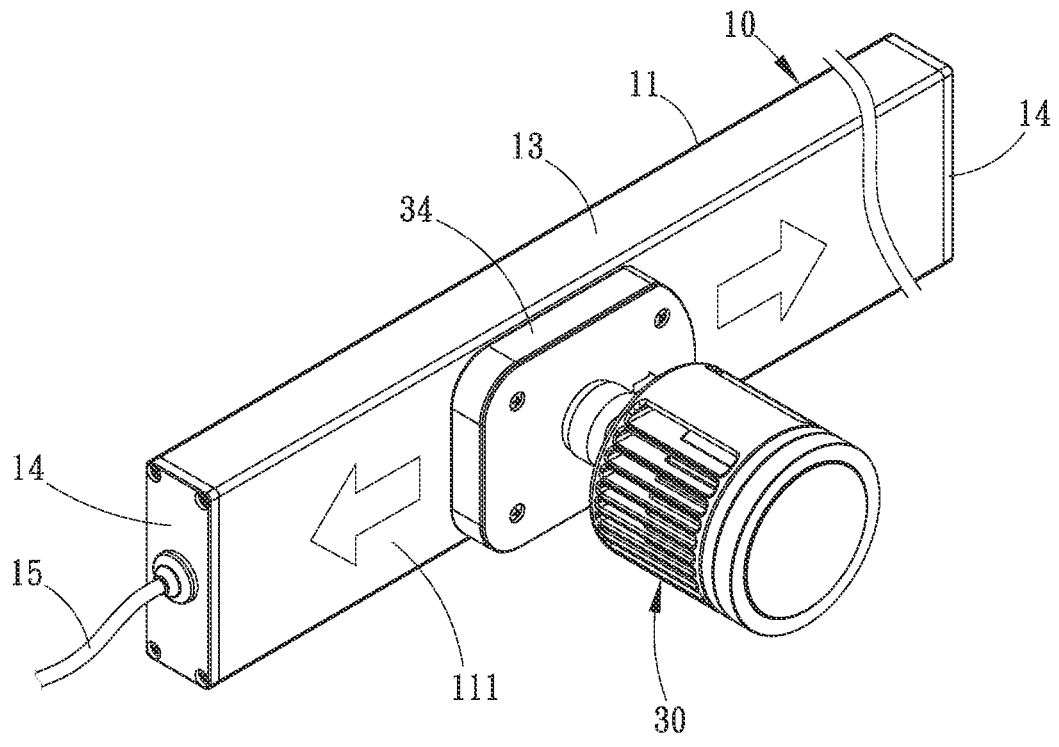
FIG. 1 is a schematic diagram of the combination of the lamp and the power supply track of the present invention.
Figure 2:
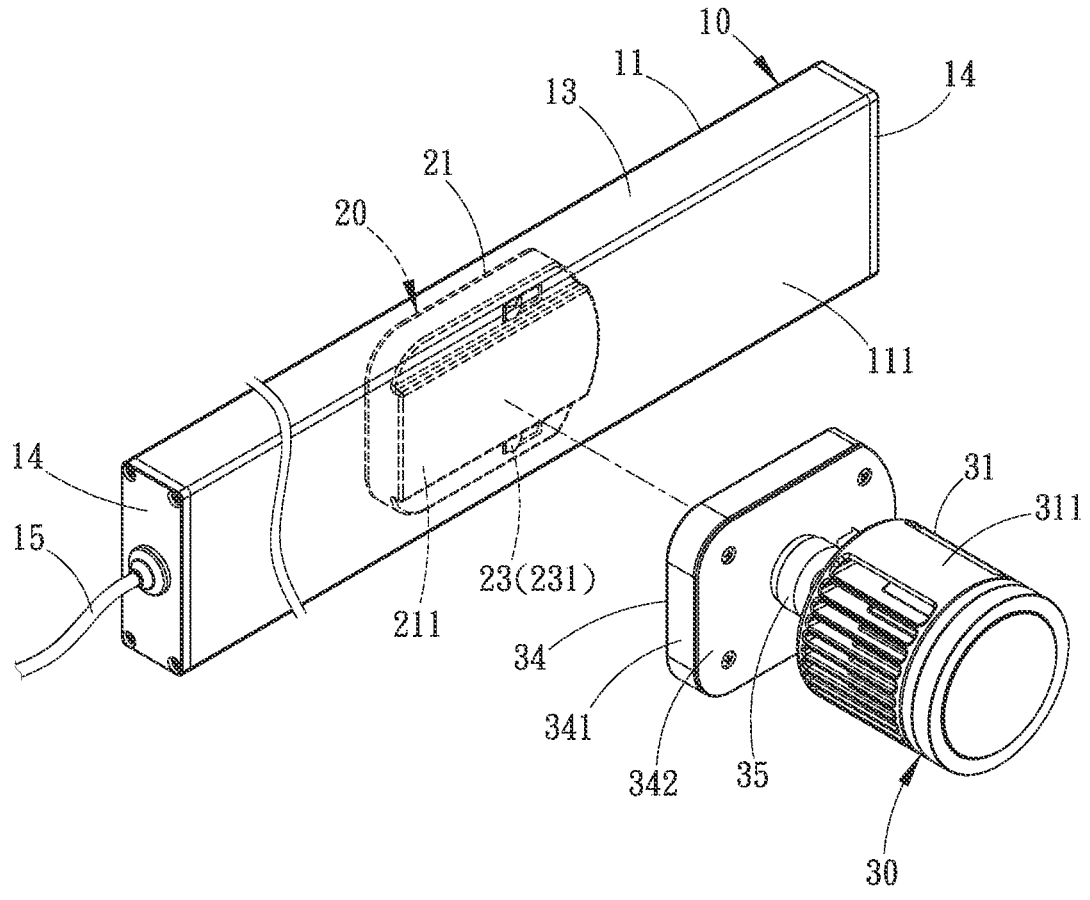
FIG. 2 is a schematic diagram of the separation of the lamp and the power supply track of the present invention.

The technical features and other functions and purposes of the present invention are described in detail below with reference to the embodiments of the drawings:

Referring to FIGS. 1 and 2, the present invention shows a wireless powered waterproof track light, which is a waterproof track light that can be installed on a wall or ceiling and can move and adjust the lamp position arbitrarily. The preferred embodiment comprises a power supply track 10, a wireless power supply transmitting module 20 and a lamp 30. Install the wireless power supply transmitting module 20 into the power supply track 10 so that the wireless power supply transmitting module 20 supplies power to the lamp 30 adsorbed on the power supply track 10 through wireless charging technology.

Figure 3:
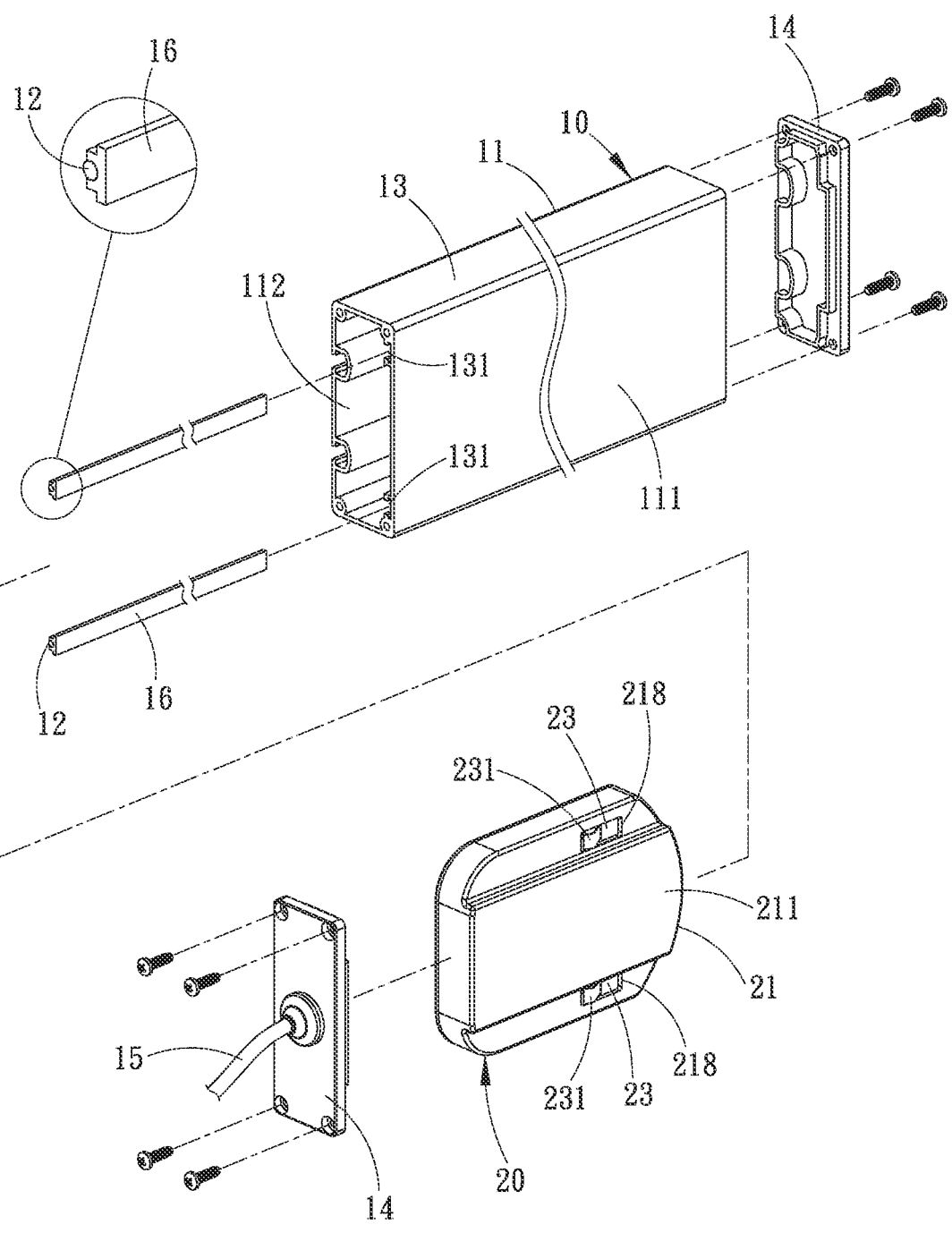
FIG. 3 is an exploded schematic diagram of the power supply track of the present invention.

Referring to FIGS. 2 and 3, the power supply track 10 preferably comprises a track body 11 and two conductive strips 12. The outer surface of the track body 11 has a lamp mounting surface 111, and the interior of the track body 11 has a closed sliding space 112 corresponding to the lamp mounting surface 111. The two conductive strips 12 are arranged in the closed sliding space 112 and extend parallel to the lamp mounting surface 111 to supply power to the wireless power supply transmitting module 20. The track body 11 is preferably implemented with a tube body 13, two end caps 14 and a power cord 15. The tube body 13 can be an aluminum extruded straight rectangular tube or an arc rectangular tube. A plane outside the rectangular tube is used as the lamp mounting surface 111 for one or more lamps 30 to be magnetically attached to the lamp mounting surface 111. The inside of the rectangular tube serves as the above-mentioned closed sliding space 112, and two strip-shaped mounting grooves 131 can be provided on the inner wall of the tube body 13, and the two conductive strips 12 are fixed in the two strip-shaped mounting grooves 131. The two end caps 14 hermetically cover the two opposite ends of the tube body 13 respectively to prevent water and moisture from entering the closed sliding space 112. One end of the power cord 15 passes through the wall of one end cap 14 or tube body 13, enters the closed sliding space 112 and is connected to the two conductive strips 12, and the other end is connected to a power supply (such as a transformer, etc.). The above-mentioned conductive strips 12 are preferably copper strips. One side of each of the conductive strips 12 is combined with an insulator 16, so that each conductive strip 12 or the insulator 16 is fixed in one respective strip-shaped mounting groove 131, and can be used to power the wireless power supply transmitting module 20.

Figure 4:
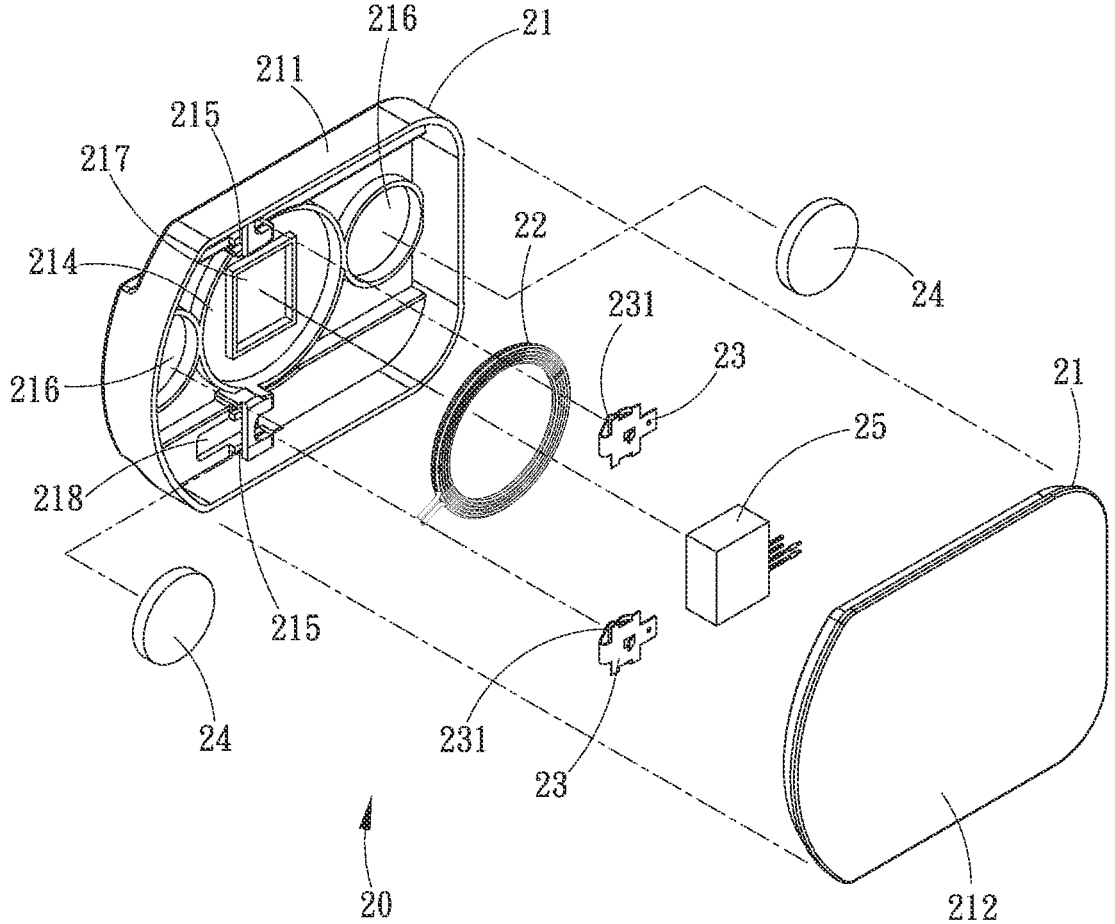
FIG. 4 is an exploded schematic diagram of the wireless power supply transmitting module of the present invention.
Figure 5:
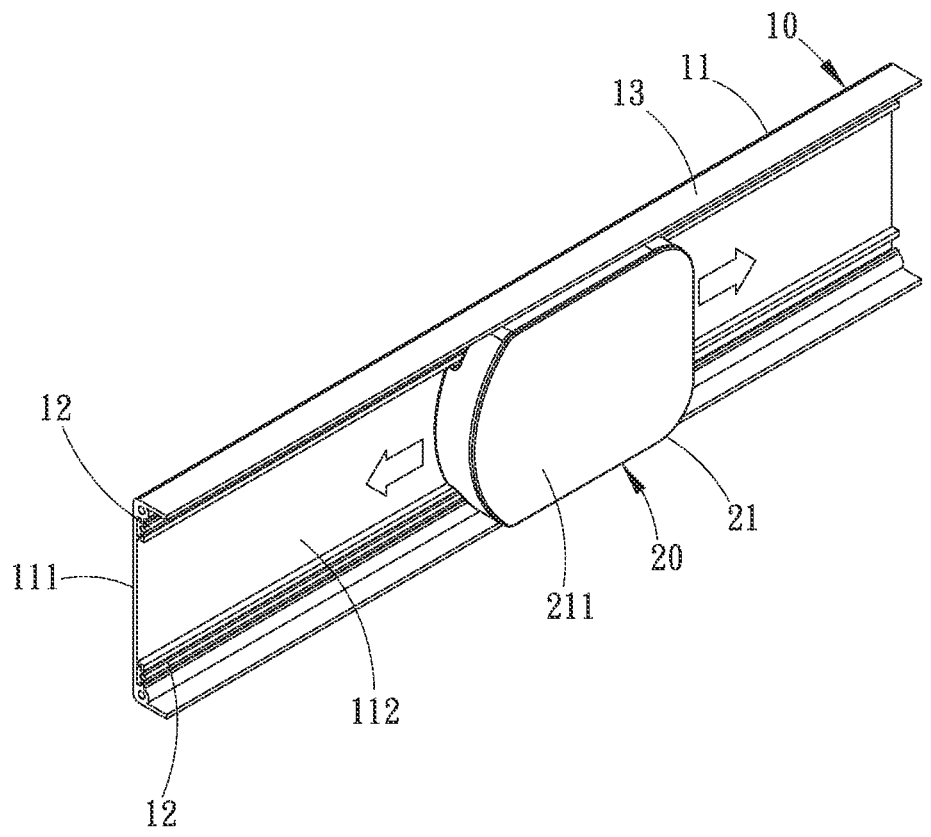
FIG. 5 is a sliding schematic diagram of the wireless power supply transmitting module of the present invention.

Referring to FIGS. 3, 4 and 5, the wireless power supply transmitting module 20 preferably comprises a slide 21, a transmitting coil 22, two conductive terminals 23, two first magnets 24 and a magnetic switch 25. The slide 21 is set in the closed sliding space 112 of the track body 11, and its position can be moved arbitrarily in the closed sliding space

112. The transmitting coil 22 is a copper coil wound into a ring and is arranged on the slide 21 to generate a magnetic field in the closed sliding space 112 toward the lamp mounting surface 111. The two conductive terminals 23 are components stamped from copper sheets. They are respectively fixed on the slide 21 and connected to the transmitting coil 22, so that the two conductive terminals 23 contact the two conductive strips 12 and move together with the slide 21 (as shown in FIG. 5). The first magnets 24 are permanent magnets fixed on the slide 21 and are mutually attracted to the lamp 30 outside the track body 11. The magnetic switch 25 is an existing electronic component and is connected in the circuit of the transmitting coil 22. When the lamp 30 is adsorbed on the lamp mounting surface 111, the magnetic switch 25 forms a path through the magnetism of a third magnet 36 of the lamp 30, and then energizes the transmitting coil 22. On the contrary, when the lamp 30 is detached, the magnetic switch 25 forms an open circuit, and its transmitting coil 22 will no longer consume power.

Referring again to FIG. 4, the configuration of the slide 21 is not limited, and is preferably implemented as a first housing 211 and a first cover 212. The first housing 211 has a plurality of mounting grooves 214, 215, 216, and 217 inside for the mounting of the transmitting coil 22, the two conductive terminals 23, the first magnets 24, and the magnetic switch 25. This forms a modular component, which facilitates the installation of multiple wireless power supply transmitting modules 20 in the track body 11. The first housing 211 has two openings 218 that communicate the mounting grooves 215 for the two conductive terminals 23 with the outside of the first housing 211. The above-mentioned conductive terminals 23 are respectively provided with a conductive elastic piece 231. When each conductive terminal 23 is fixed on the respective mounting groove 215, the conductive elastic pieces 231 protrudes outside the first housing 211 through the openings 218 (as shown in FIG. 3), so that the conductive elastic pieces 231 can movably contact the respective conductive strips 12, and the slide 21 (first housing 211) can provide power to the transmitting coil 22 when the track body 11 moves to any position (as shown in FIG. 5).

Figure 6:
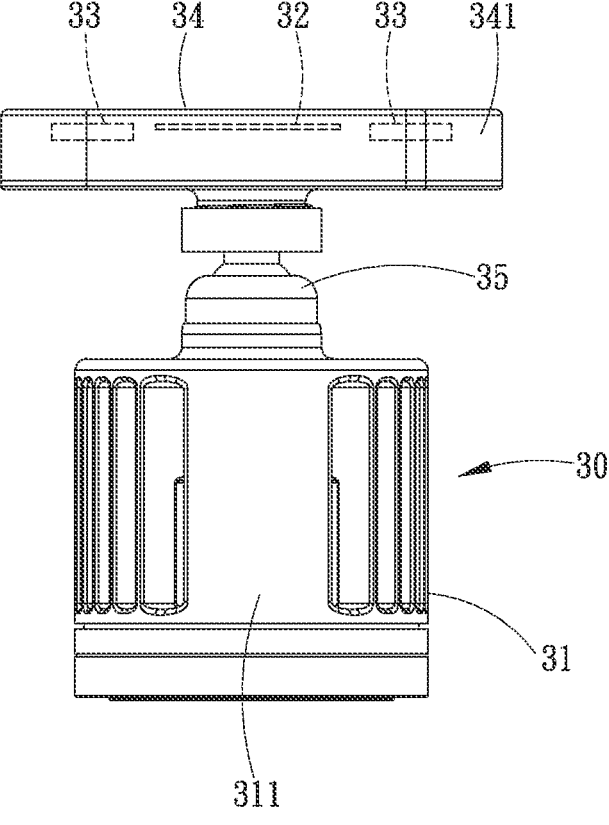
FIG. 6 is a schematic front view of the lamp of the present invention.
Figure 7:
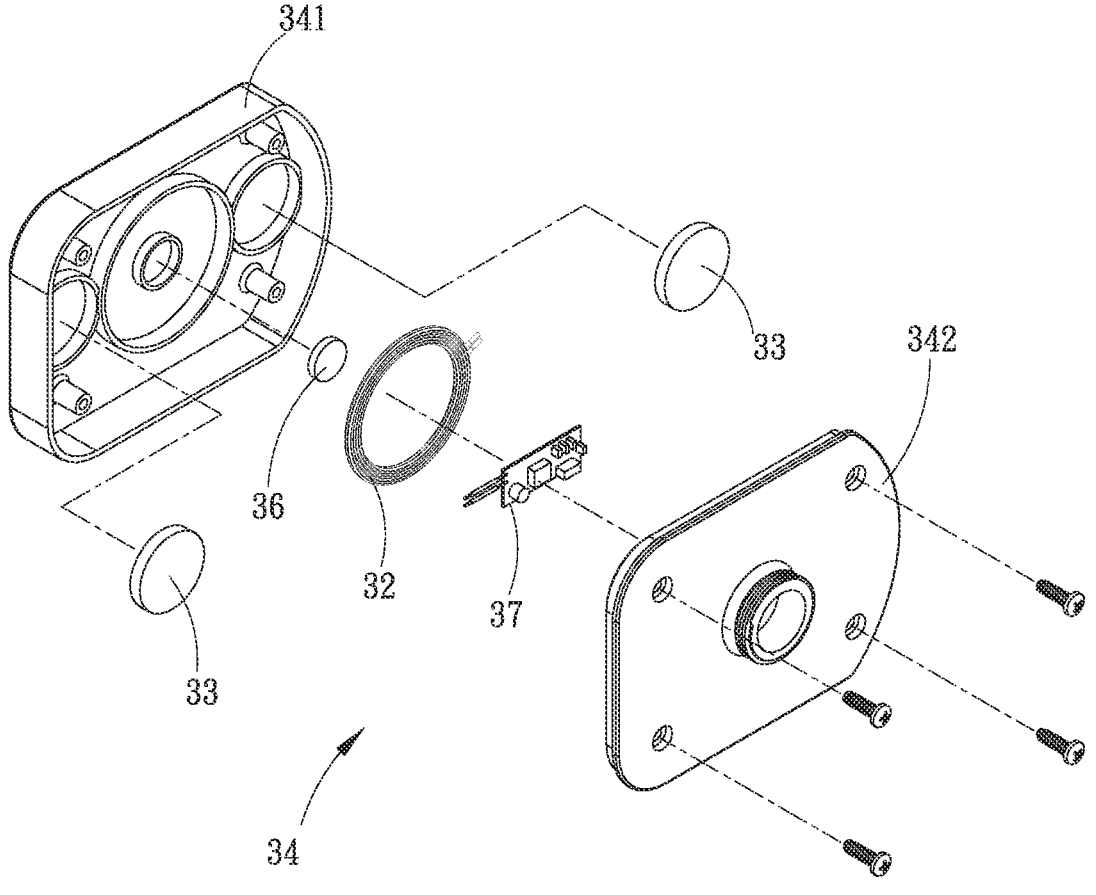
FIG. 7 is an exploded schematic diagram of the first embodiment of the wireless power receiving module of the present invention.

Referring again to FIGS. 6 and 7, the lamp 30 is preferably implemented with a lamp body 31, a receiving coil 32, two second magnets 33 and a wireless power receiving module 34. The lamp body 31 is an existing LED lamp. In the present invention, it is used to be detachably arranged on the lamp mounting surface 111 of the track body 11, and its position can be moved on the lamp mounting surface 111. The receiving coil 32 and the above-mentioned transmitting coil 22 are both copper coils wound into a ring. They can be arranged in the wireless power receiving module 34 at the rear end of the lamp body 31 or directly installed inside the rear end of the lamp body 31. When the receiving coil 32 is close to the transmitting coil 22, the receiving coil 32 can induce the magnetic field of the transmitting coil 22 to generate an induced current, which supplies power to the lamp body 31. The second magnets 33 is fixed in the wireless power receiving module 34 of the lamp body 31 or directly installed inside the rear end of the lamp body 31. It is used to adsorb to the first magnets 24 of the wireless power supply transmitting module 20 through its magnetic properties, so that the lamp body 31 can be detachably adsorbed on the lamp mounting surface 111.

Figure 8:
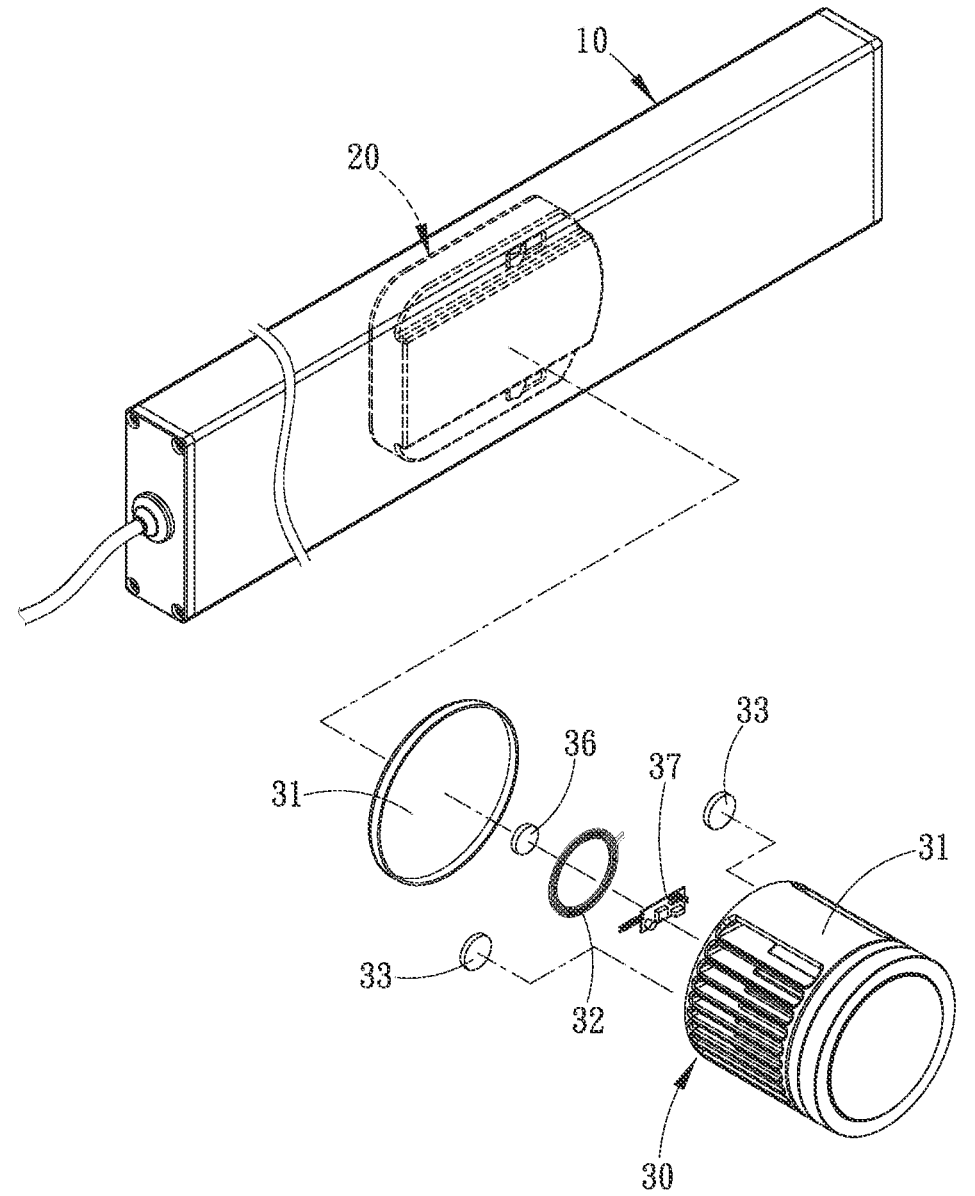
FIG. 8 is an exploded schematic diagram of the second embodiment of the wireless power receiving module of the present invention.

Referring again to FIGS. 6 and 7, the above-mentioned wireless power receiving module 34 comprises a second housing 341 and a second cover 342. The second housing 341 or second cover 342 is coupled to the rear end or one side of the lamp body 31 through a direction adjustment structure 35, and then the receiving coil 32 and the second magnet 33 are respectively fixed in the second housing 341, so that the wireless power receiving module 34 is attracted to the above-mentioned first magnets 24 through the second magnets 33, and then the lamp body 31 is detachably adsorbed on the lamp mounting surface 111 of the track body 11 and the adsorption position can be moved and adjusted. The direction adjustment structure 35 can be an existing universal joint, so that the lamp body 31 can adjust the angle of illumination. Referring to FIG. 8 again, the present invention does not need to implement the above-mentioned second housing 341 and second cover 342, but directly fixes the receiving coil 32 and the second magnets 33 inside the lamp housing 311 at the rear end of the lamp body 31, which can also achieve the same effect of attracting the first magnets 24. In addition, the wireless power receiving module 34 (second housing 341) or the lamp housing 311 of the lamp body 31 of the present invention is additionally provided with a rectifier circuit board 37 inside. The rectifier circuit board 37 is connected between the receiving coil 32 and the light-emitting unit of the lamp body 31 to provide electric energy to the lamp body 31.

Referring again to FIGS. 1 and 2, when the present invention is used, the power supply track 10 can be fixed on a wall, ceiling or other objects. Each power supply track 10 is preset with a plurality of wireless power supply transmitting modules 20. As long as the rear end of the lamp 30 is attached to the lamp mounting surface 111 of the track body 11, the second magnets 33 can attract the first magnets 24 of the wireless power supply transmitting module 20, and the lamp 30 can be fixed on the lamp mounting surface 111, and the lamp 30 can also be moved to cause the wireless power supply transmitting module 20 to move together in the closed sliding space 112. It is worth mentioning that the present invention uses wireless power supply technology to eliminate the open structure technology of conventional track light lamps that need to use conductive terminals to contact two conductive strips, so that the track body 11 can be implemented as a tube body with both ends closed, and the lamp 30 can also be implemented into a fully sealed structure, thereby achieving the function of the track light being waterproof and installed outdoors.

Although a particular embodiment of the invention has been described in detail for purposes of illustration, various modifications and enhancements may be made without departing from the spirit and scope of the invention. Accordingly, the invention is not to be limited except as by the appended claims.

What the claimed is:

1. A wireless powered waterproof track light, comprising a power supply track, a wireless power supply transmitting module and a lamp, wherein:

said power supply track comprises a track body and two conductive strips, said track body comprising a lamp mounting surface on an outside thereof and a closed sliding space on a side thereof corresponding to said lamp mounting surface, said two conductive strips being set in said closed sliding space and extending parallel to said lamp mounting surface to supply power to said wireless power supply transmitting module;

said wireless power supply transmitting module comprises a slide, a transmitting coil, two conductive terminals and two first magnets, said slide being set in said closed sliding space of said track body to move arbitrarily within said closed sliding space, said transmitting coil being arranged on said slide to generate a magnetic field in said closed sliding space toward said lamp mounting surface, said two conductive terminals being fixed on said slide and connected to said transmitting coil, said two conductive terminals removably contacting said two conductive strips, said first magnets being fixed on said slide to adsorb each other with said lamp;

said lamp comprises a lamp body, a receiving coil and two second magnets, said lamp body being detachably set on said lamp mounting surface of said track body and movable on said lamp mounting surface, said receiving coil being set in said lamp body to sense the magnetic field of said transmitting coil to generate an induced current and supply power to said lamp body, said second magnets being fixed on said lamp body and being used to attract said first magnets magnetically, so that said lamp body is detachably adsorbed on said lamp mounting surface.

2. The wireless powered waterproof track light as claimed in claim 1, wherein said wireless power supply transmitting module comprises a magnetic switch connected in a loop of said transmitting coil; said lamp is provided with a third magnet corresponding to said magnetic switch, so that when said lamp is adsorbed on said lamp mounting surface, said third magnet activates said magnetic switch to form a path to energize said transmitting coil.

3. The wireless powered waterproof track light as claimed in claim 2, wherein said slide comprises a first housing, said first housing comprising a plurality of mounting grooves inside for the mounting of said transmitting coil, said two conductive terminals, said first magnets and said magnetic switch and two openings respectively communicating two said mounting grooves for said two conductive terminals with an outside of said first housing, said conductive terminals fixed in the respective said mounting grooves protruding outside said first housing through said openings of said first housing.

4. The wireless powered waterproof track light as claimed in claim 3, wherein said conductive terminals each comprises a conductive elastic piece protruding from a front of said first housing, said conductive elastic piece removably contacting one respective said conductive strip.

5. The wireless powered waterproof track light as claimed in claim 1, wherein said track body comprises a tube body, two end caps and a power cord, said tube body define said closed sliding space therein, said two end caps hermetically covering two opposite ends of said tube body respectively, said power cord having one end thereof passing through one of the two end caps and entering said closed sliding space and connected to said two conductive strips and an opposite end thereof connected to a power supply.

6. The wireless powered waterproof track light as claimed in claim 5, wherein said tube body comprises two strip-shaped mounting grooves located on an inner tube wall thereof; said two conductive strips are fixed on said two strip-shaped mounting grooves respectively.

7. The wireless powered waterproof track light as claimed in claim 6, wherein said conductive strips are preferably copper strips, each said conductive strip having one side thereof combined with an insulator, so that each said conductive strip or said insulator of each said conductive strip is fixed in one respective said strip-shaped mounting groove.

8. The wireless powered waterproof track light as claimed in claim 2, wherein said lamp comprises a wireless power receiving module, said wireless power receiving module comprising a second housing, said second housing being combined with a rear end or one side of said lamp body through a direction adjustment structure; said receiving coil and said second magnets are respectively fixed in said second housing, so that said lamp body is detachably adsorbed on said lamp mounting surface through magnetic attraction between said second magnets and said first magnets.

9. The wireless powered waterproof track light as claimed in claim 8, wherein said direction adjustment structure is an universal joint.

10. The wireless powered waterproof track light as claimed in claim 8, wherein said lamp further comprises a rectifier circuit board, said rectifier circuit board being fixed on said wireless power receiving module and connected between said receiving coil and a light-emitting unit of said lamp body.

11. The wireless powered waterproof track light as claimed in claim 9, wherein said lamp further comprises a rectifier circuit board, said rectifier circuit board being fixed on said wireless power receiving module and connected between said receiving coil and a light-emitting unit of said lamp body.

12. The wireless powered waterproof track light as claimed in claim 2, wherein said lamp body comprises a lamp housing, and said receiving coil and said second magnet are arranged inside a rear end of said lamp housing.

13. The wireless powered waterproof track light as claimed in claim 12, wherein said lamp further comprises a rectifier circuit board, said rectifier circuit board being fixed in said lamp housing and connected between said receiving coil and a light-emitting unit of said lamp body.

* * * * *